July 25, 1950 — H. M. GEYER — 2,516,200
PLANETARY GEARING
Filed Aug. 6, 1947 — 3 Sheets-Sheet 1

INVENTOR.
Howard M. Geyer
BY
Spencer, Hardman & Fehr
HIS ATTORNEYS

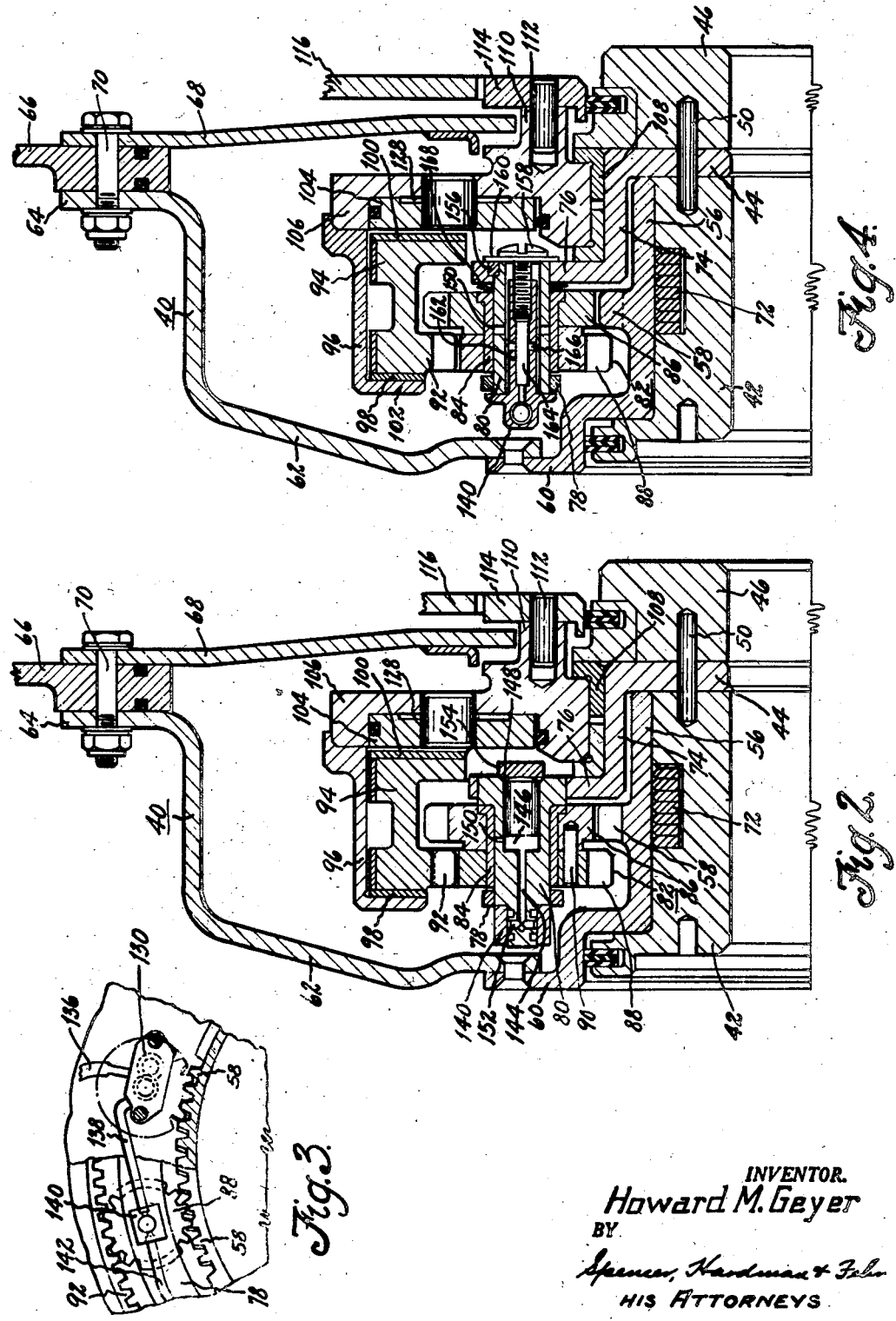

July 25, 1950  H. M. GEYER  2,516,200
PLANETARY GEARING
Filed Aug. 6, 1947  3 Sheets-Sheet 3

INVENTOR.
Howard M. Geyer
BY
HIS ATTORNEYS

Patented July 25, 1950

2,516,200

UNITED STATES PATENT OFFICE 2,516,200

PLANETARY GEARING

Howard M. Geyer, Dayton, Ohio, assignor to General Motors Corporation, Detroit, Mich., a corporation of Delaware Application August 6, 1947, Serial No. 766,532

2 Claims. (Cl. 74—786)

This invention relates to back-lash adjusters and lost-motion take-ups in gearing, and particularly in planetary gearing, where a driven member is designed to be driven at a speed or speeds differing from the driving speed.

One of the objects of the invention is to take up looseness commonly inherent in planetary gear trains, so that the driven member may progress through changes in torque applied to it without exhibiting roughness and angular vibration.

Another object of the invention is to provide means in planet gearing subject to change speed ratio, where the change in load transmitted from the driving member to the driven member is guarded against severe shock when a change in speed is effected.

Further objects and advantages of the present invention will be apparent from the following description reference being had to the accompanying drawings wherein a preferred embodiment of the present invention is clearly shown.

In the drawings:

Fig. 2 is an enlarged view in section of one form of gear support.

Fig. 3 is a detailed view of an auxiliary power means indicated by the line and arrows 3—3 of Fig. 1.

Fig. 4 is an enlarged sectional view of a modified form of gear support, being similar to the showing of Fig. 2.

Figure 1:
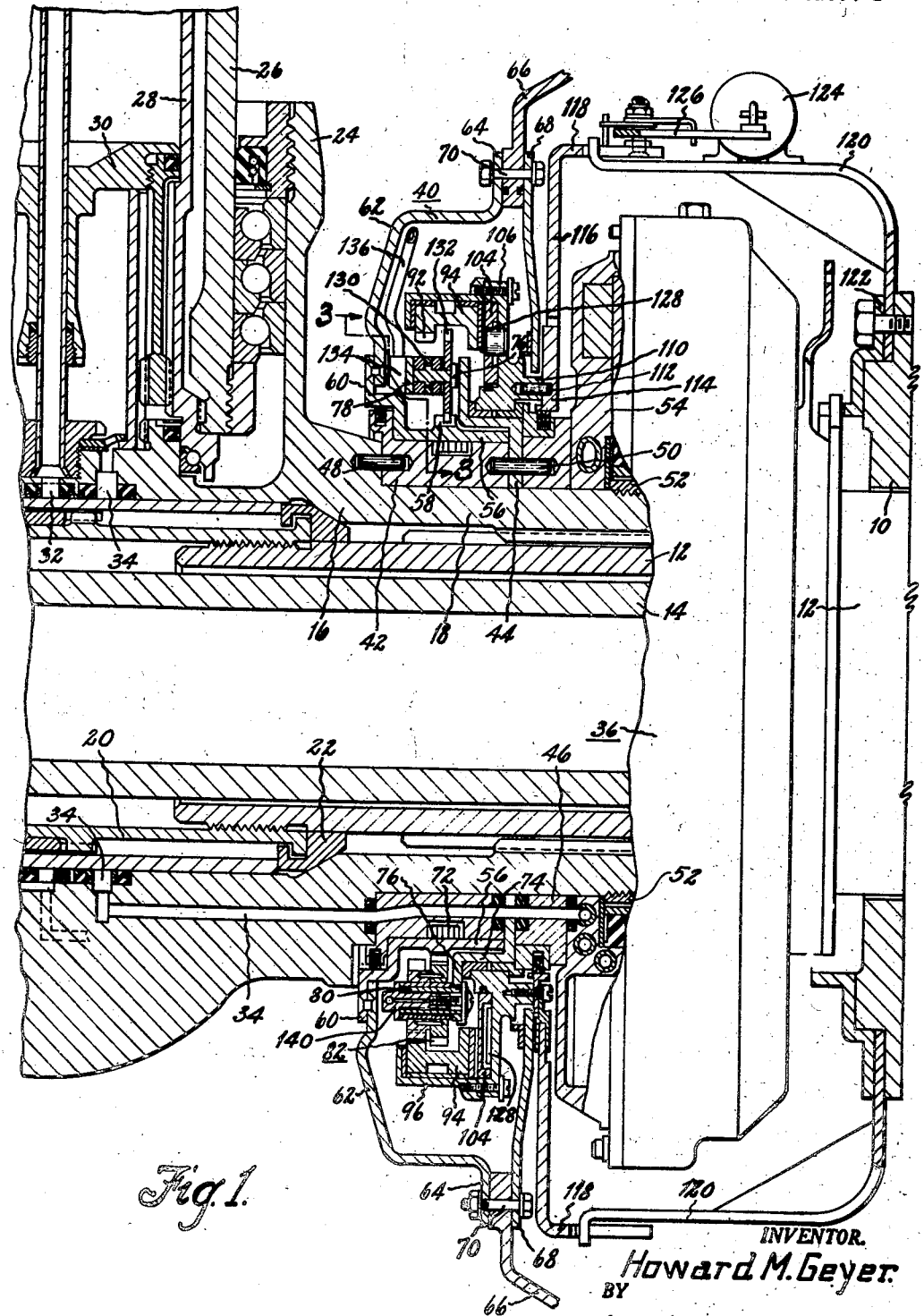
Fig. 1 is a sectional view of a mechanism to be driven at either of two speeds and embodying the instant invention.

Referring particularly to the drawings, 10 indicates a support terminating a gear casing or the like, such as the nose portion of an aircraft from which extends a pair of shafts 12 and 14 for rotating a pair of propeller hubs in opposite directions, one of which hubs is shown at 16 as having an axially extending sleeve 18 splined to one of the shafts as 12 for driving connection with a source of power within the gear casing. The hub 16 is normally wound on the shaft 12 where it is secured by the conventional nut 20 threaded upon the end of the shaft for seating of a forward cone 22. The hubs each are provided with a plurality of sockets 24 within which are journalled propeller blades 26 provided with fluid pressure torque units 28 for shifting the blades in a pitch shifting sense. The torque units comprise a piston 30 the opposite sides of which are selectively exposed to fluid pressure from fluid passages 32 and 34 within the hub through the operation of a regulator 36 drivingly mounted on the hub sleeve 18, substantially as disclosed in the patents to Blanchard et al. 2,307,101 and 2,307,102.

Also mounted on the hub sleeve 18 is a two speed fan drive unit 40 for cooling the engine located within the craft. The fan drive unit comprises a group of driven elements existing in the form of a mounting ring 42, a spider ring 44, and a spacing ring 46 surrounding the hub sleeve 18 and maintained in driven relation with the hub by appropriate dowels 48 and 50. These driven elements are maintained in place upon the sleeve by means of a sleeve nut 52 forcing a support plate 54 of the regulator 36 against the spacing ring 46 and thence 44 and 42 against a shoulder of the hub at the juncture with the sleeved extension 18. Journalled about the mounting ring 42 there is a sleeve 56 providing a ring of helical teeth forming a sun gear 58, and an off-set flange 60 to which is secured a drum 62 terminating in a peripheral flange 64 supporting fan blades 66. An annular plate 68 also attached to the drum periphery and the blades 66, such as by the screw devices 70, combines therewith to form a gear casing for enclosing the fan drive mechanism. The group of elements secured to the sleeve 56 is adapted to rotate with the group of driven elements attached to the mounting ring 42, and hence at hub speed, or is adapted to rotate at an accelerated speed through the agency of a planetary system of drive for the sun gear, and the provisions of a one way clutch 72 disposed between the ring 42 and sleeve 56.

The spider ring 44 comprises a cylindrical portion 74 to which is attached a radial flange 76 joined to a spaced ring 78 by appropriate abutments to make a rigid structure, and so that spindles 80 can be secured in the flange 76 and receive support in the ring 78 and thereby provide firm pivotal support for the planet gear assemblies 82 which consist as shown in Figs. 2 and 4 of a bearing sleeve 84 rotatable on the spindle and a helical toothed pinion 86 fixedly connected with a spur pinion 88, both pinions being secured on the bearing sleeve 84 and pinned together by the pin 90 so that the elements thereof act as an integral unit. The planet gear assemblies are so proportioned with respect to the spindle and support that they are capable of limited axial movement between the flange 76 and the ring 78, but always in opposition to a resisting force, as will presently appear. The helical toothed pinion 86 meshes with the helical toothed sun gear 58 while the spur toothed pinion 88 meshes with a spur toothed ring gear 92 provided by a floating ring 94 rotatably carried by a drum 96, the ring 94 having friction faces 98 and 100 cooperable with elements 102 and 104 of the drum by which the ring 94 may be either arrested in movement or permitted to rotate with respect to the drum 96.

To control the arrested and rotative movement of the ring 94, the element 104 exists in the form of an annular piston set into a support ring 106 carrying the drum 96 and journalled about the cylindrical portion 74 of the spider ring by the aid of bearing sleeves or rings 108, with a cylindrical portion 110 of the ring 106 extending rearwardly to have pinned engagement at 112 with a ring 114 having lug and notch engagement with a yoke member 116 having diametric arms 118 (Fig. 1) engaged by notches of a bracket member 120 rigidly supported from the craft nosing 10, by the screw devices 122. Supported on the bracket 120 there is an electromagnet or other relay device 124 that selectively controls a linkage 126 for actuating a control valve within the gear housing provided by the drum members 62 and 68 for applying and withdrawing a source of fluid pressure to the chamber 128 in the support ring 106 behind the annular piston 104, so that the arresting or running of the ring gear 94 may be selectively controlled. Inasmuch as the control of the ring gear is the subject matter of another application S. N. 656,719, it is not to be specifically claimed herein. It should be understood, however, that when fluid pressure is applied to the chamber 128 the piston 104 then moves axially to engage the friction face 100 and force the ring 94 with its friction face 98 against the drum element 102. The ring gear 102 is thus arrested with respect to the drum 96, and since this drum structure is retained against rotation with the propeller assembly due to the support 106 and its engagement with the elements or members 114, 116, 120 and 10, then the ring gear 92 will stand still with respect to the shaft support 10. On the other hand, when the pressure within the chamber 128 is relieved, the friction faces are disengaged and the ring 94 backs off sufficiently to allow the ring gear 92 to run free within the drum 96 and with the pinion assembly 82, thus driving from housing 62 at the same speed of the hub 16 through the one-way spring clutch 72. The source of fluid pressure for actuating the piston 104 may be in the form of a gear pump similar to that shown at 130 of Fig. 1, and may be so mounted on the outside of drum 96, which is nonrotatable, that its impeller wheel is closely adjacent the inner wall of the member 62 so that the fluid with which the drum is charged, will, when rotated with the drum, effect the rotation of the pump impeller in the nature of an undershot water wheel. Since the pump is supported on a relatively fixed or nonrotatable structure, and since the drum 62 when the propeller is rotating, is always rotating either at propeller speed or at some accelerated value, then the fluid charge of the drum is always flowing past the impeller wheel of the pump.

As shown in Fig. 2, the pinion assembly 82 is movable axially between the flange 76 and the ring 78 by fluid pressure developed by the pump 130 of Fig. 3, which also serves as a lubrication pump to supply fluid under pressure to the bearings of the planet assemblies. This pump as shown in Fig. 1 is supported between the flange 76 and the ring 78 and provides a gear 132 meshing with the sun gear 58. Fixed to the ring 78 there is a tubular fitting 134 from which extends an open-ended tube or scoop 136 adapted to pick up oil from the periphery of the drum 62 and deliver it to the intake of the pump, from which a delivery passage 138 connects with a fitting 140 supported by the ring 78 at the end of each spindle 80, tube sections 142 extending from fitting to fitting so that all of the spindles are supplied with fluid under pressure. The spindle 80 is provided with a bore 144 enlarged at 146 to form a piston cylinder receptive of a piston 148 and from which chamber a lateral opening 150 communicates with the inside of the bearing sleeve 84 of the planet assembly for lubrication purposes. A number of cross passages 152 open into the bore 144 and communicate with the passage in the fitting 140 so that fluid developed by the pump 132 may find its way to the chamber 146 and the bearings of the planet assemblies. In Fig. 2 the spindle 80 is capable of some axial movement within the supporting apertures of the flange 76 and the ring 78, which is accomplished by the result of fluid pressure in the chamber 146 acting against the end of piston 148 that abuts against a stop 154 secured to the flange 76. As fluid pressure is applied to the immovable piston 148 the spindle 80 moves toward the left as viewed in Fig. 2, and the inclination of the spiral teeth on the pinion 86 and the sun gear 58 are such that there is always resistance to such axial movement due to the driving torque when the ring gear is arrested. That is, when the ring gear 92 is arrested by the fixed support such as to cause the pinions to roll over the ring gear 92 they will then drive the sun gear 58 and the inclination of the matched helical gear teeth will tend to move the planet assembly in the opposite direction to that at which the pressure in the chamber 146 tends to move the assembly. Since the spur teeth of the pinion 88 and the ring gear 92 offer no resistance to this tendency for axial movement then the mating relation between the helical toothed members 58, 86 is always maintained in contact and all back-lash and lost motion is eliminated. As soon as the ring gear 92 is arrested for driving the pinions 88, the pinions 86 rigidly connected thereto will also rotate and drive the sun gear 58 which effects rotation of the pump driving gear 132 since it meshes with the sun gear 58. Thus, as soon as the planet assembly begins to rotate lubricant fluid is supplied to the bearings and to the chamber 146, the pressure of which varies with speed or load upon the parts thus fitting the shifting force for the planet assembly to the needs of the mechanism.

In the showing of Fig. 4 the planet assembly is shiftable upon the spindle 80 which is there rigidly fixed in the flange 76 by a key 156, and a screw device 158 engaging a washer 160 disposed against the flanged threads into an extension 162 of the fitting 140 that projects within the bore of the spindle 80. The fitting 140 opens into a bore 164 of the extension 162 that has lateral passages 166 communicating with the transverse bore 150 of the spindle so that the bearings for the planet assembly are well lubricated under pressure. Here, the axial movement of the planet assembly is not accomplished by the fluid pressure of the pump 130, but is obtained by means of a dished spring or cupped washer 168 disposed around the spindle 80 and between the flange 76 and the bearing sleeve 84 of the planet assembly. The dished spring normally tends to shift the planet assembly to the left against the urge driving torque at the helical engagement 58, 86 to shift the planet assembly to the right, the spring member yielding to the increase of driving force so as to keep the tooth engagement at all times.

Figure 5:
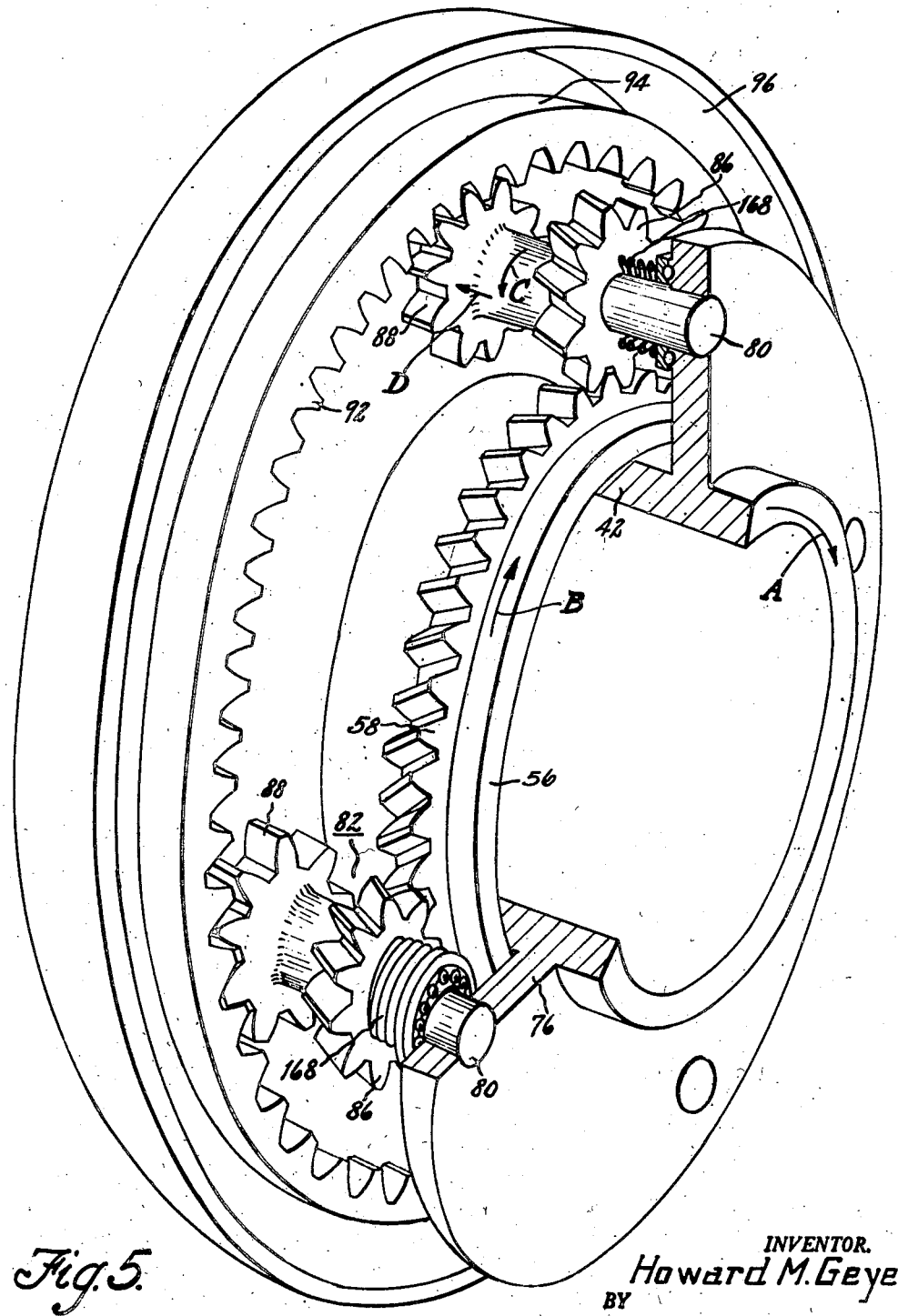
Fig. 5 is an enlarged schematic view illustrating the features of the invention.

In Fig. 5 there is shown in the simplest basic form the principal features of this invention where 42 represents a rotating member providing a source of driving force and provides the flange 76 supporting the planet assemblies 82 as journalled on fixed spindles 80 carried by the flange 76. The planet assemblies are capable of moving axially of the supporting spindles 80 and are urged in one direction by the spring 168 disposed around the spindle 80 and between the flange 76 and the near pinion 86 whose helical teeth match up with the helical teeth of the sun-gear 58 that is to be driven and thereby transmit its motion to the sleeve 56. The element 96 represents a stationary element providing the ring gear 92 over which the pinion 88 is engageable through its spur teeth, and which when the rotating member 42 with its planet assemblies rotate with respect to it, effect rotation of both pinions and accelerated rotation of the sun gear 58. Considering that the driving element 42 rotates clockwise as indicated by the arrow A, then the planet assemblies 82 will revolve with the flange 76 in a clockwise direction, and if the ring gear 92 is free to rotate within the drum 96 then the rotation of the sun-gear 58 and the ring gear 92 will be at the same speed and in the same direction as the rotation of the driving member 42 due to the one way clutch connection 72, as is indicated by the arrow B. However, if the drum 96 clutches or arrests rotation of the ring gear 92 then revolution of the planet assemblies 82 will cause the pinions 88 to roll along the inside of the ring and rotate about their individual spindles 80 in the direction of the arrows C, thereby causing an accelerated rotation of the sun gear 58 in the direction of the arrow B. During the free running of the ring gear 92 with respect to the drum 96 there is no driving force between the ring gear 92 and the sun gear 58 so that the spring 168 is free to move the planet assembly 82 to the extreme left as indicated by the arrow D. During arrested condition of the ring gear 92 or when the sun gear is being driven at an accelerated speed, the pinion 86 rotates in the direction of the arrow C to drive the sun gear 58 in the direction B, and the resistance to drive of the sun gear is sufficient to bias the planet assembly to the right against the urge of the spring 168 which bias is provided by the inclination of the helical teeth on the elements 58, 86. As the load varies, the spring will be differently flexed, but always taking up the back-lash or lost motion in the planet gear connection.

While the embodiment of the present invention as herein disclosed, constitutes a preferred form, it is to be understood that other forms might be adopted, all coming within the scope of the claims which follow.

What is claimed is as follows:

1. A power transmission mechanism for driving a fan concentrically arranged about a power shaft, comprising in combination, a planet spider driven by the power shaft and providing axially movable planet spindles, a hollow annular structure journalled on the power shaft concentric with the spider and providing a helical sun gear, an arrestable ring gear concentric therewith providing spur teeth, non-rotating means supporting the ring-gear, and providing a movable friction member selectively engageable with the ring gear, an intervening gear assembly rotatable upon the spindles of said spider and comprising a helical toothed planet pinion meshing with the sun gear and a spur toothed planet pinion meshing with the ring gear, whereby driving thrust tends to move the intervening gear assembly axially, hydraulic means restraining the said axial movement, comprising a pump supported by the planet spider and having a gear driven by said sun gear, said hollow structure providing peripheral arranged fan blades and so enclosing the ring gear and planet spider to provide an annular fluid containing reservoir rotatable with the fan blades and sun gear, said pump having an intake from said rotatable reservoir, piston and cylinder means carried by the planet spider for shifting the said spindles axially with respect to said spider, and passage means connecting the outlet of said pump to said cylinder for actuating the piston thereof and passage means connected with the cylinder and spindle surface for lubricating the intervening gear assembly.

2. In a fan drive, a driving assembly providing a planet spider, said spider having axially shiftable hollow spindles, doubled faced planet pinions rotatable on each spindle and providing a spur element drivingly connected with a helical element, a non-rotatable support assembly providing a ring gear surrounding said driving assembly and engaging said spur element, a fan assembly journalled for rotation on the driving assembly and providing a helical sun gear engaging the helical element, said fan assembly providing a reservoir surrounding the support assembly to enclose a body of fluid medium, a fluid pressure pump carried by said driving assembly and having an intake pipe ending in the reservoir adapted to pick up fluid medium from said reservoir, passage means connecting the pump outlet to the interior of said axially shiftable spindles, a piston within said spindle and engaging the spider, and gear means connecting the pump with the sun gear, whereby the rotation of said driving assembly rotates the fan assembly through the planet pinions, and whereby the pump is driven to supply fluid under pressure within the shiftable spindles to yieldably restrain axial shift of the planets by reason of the driving torque applied through the helical sun gear, and means to lubricate the planets on the said spindles.

HOWARD M. GEYER.

REFERENCES CITED

The following references are of record in the file of this patent:

UNITED STATES PATENTS

| Number | Name | Date |
|---|---|---|
| 1,968,604 | Hertz | July 31, 1934 |
| 2,154,532 | Ryder | Apr. 18, 1939 |
| 2,231,784 | Von Thunger | Feb. 11, 1941 |
| 2,369,422 | Williams | Feb. 13, 1945 |
| 2,402,951 | De Pew | July 2, 1946 |

FOREIGN PATENTS

| Number | Country | Date |
|---|---|---|
| 389,258 | Germany | Jan. 29, 1924 |